(12) United States Patent
Okuda et al.

(10) Patent No.: US 6,863,609 B2
(45) Date of Patent: Mar. 8, 2005

(54) METHOD FOR CONTROLLING MOVEMENT OF VIEWING POINT OF SIMULATED CAMERA IN 3D VIDEO GAME, AND 3D VIDEO GAME MACHINE

(75) Inventors: Nobuya Okuda, Kobe (JP); Tatsuya Kobayashi, Suginami-ku (JP); Hirofumi Fujimoto, Kobe (JP); Shigenobu Matsuyama, Kobe (JP)

(73) Assignee: Konami Corporation, Tokyo (JP)

( * ) Notice: Subject to any disclaimer, the term of this patent is extended or adjusted under 35 U.S.C. 154(b) by 362 days.

(21) Appl. No.: 09/923,942

(22) Filed: Aug. 7, 2001

(65) Prior Publication Data

US 2002/0022518 A1 Feb. 21, 2002

(30) Foreign Application Priority Data

Aug. 11, 2000 (JP) ........................................ 2000-245251

(51) Int. Cl.⁷ ................................................ A63F 9/24
(52) U.S. Cl. ............................... 463/36; 463/2; 463/31; 463/45
(58) Field of Search ................................ 463/36–39, 1, 463/7–8, 30–35; 273/148 B; 434/247, 251, 258, 307 R, 314, 365; 340/500; 345/418

(56) References Cited

U.S. PATENT DOCUMENTS

| | | | | |
|---|---|---|---|---|
| 5,177,872 A | * | 1/1993 | Lewis et al. | 33/366.16 |
| 5,495,576 A | * | 2/1996 | Ritchey | 345/420 |
| 5,616,078 A | | 4/1997 | Oh | |
| 5,686,942 A | | 11/1997 | Ball | |
| 5,864,333 A | | 1/1999 | O'Heir | |
| 5,913,727 A | | 6/1999 | Ahdoot | |

FOREIGN PATENT DOCUMENTS

| | | |
|---|---|---|
| CN | 1173935 | 2/1998 |
| CN | 1180579 | 5/1998 |
| GB | 2324428 | 10/1998 |
| JP | 9-138637 | 5/1994 |
| JP | 7-200162 | 8/1995 |
| JP | 8-221187 | 8/1996 |
| JP | 08221187 | 8/1996 |
| JP | 09081310 | 3/1997 |
| JP | 9-104398 | 4/1997 |
| JP | 09138637 | 5/1997 |
| JP | 10-85451 | 4/1998 |
| JP | 10-156047 | 6/1998 |
| JP | 11-86038 | 3/1999 |
| JP | 11153987 | 6/1999 |
| JP | 11-244540 | 9/1999 |
| JP | 11-272841 | 10/1999 |
| KR | 1998 23727 | 6/1998 |
| TW | 346611 | 12/1998 |
| WO | 99 27498 | 6/1999 |

OTHER PUBLICATIONS

JPO English translated version of JP 08–221187.*

* cited by examiner

Primary Examiner—Mark Sager
(74) Attorney, Agent, or Firm—Jordan and Hamburg LLP

(57) ABSTRACT

A 3D game machine includes a monitor for displaying images, a game control unit for controlling progress of a game, and an image control unit for generating and displaying a 3D image viewed from a viewing point of a simulated camera on a screen of the monitor. A transverse position and a height position of the head of a game player located in a play area before the screen of the monitor are detected using one ultrasonic transmitter and two ultrasonic receivers, and the viewing point of the simulated camera is so moved as to follow a displacing direction and a displacing amount of the detected position of the game player's head, thereby allowing the viewing point of the simulated camera to follow free movements of the game player so that images viewed from the viewing point intended by the game player are actively displayed.

16 Claims, 16 Drawing Sheets

METHOD FOR CONTROLLING MOVEMENT OF VIEWING POINT OF SIMULATED CAMERA IN 3D VIDEO GAME, AND 3D VIDEO GAME MACHINE

The present invention relates to a technique for a three-dimensional (3D) video game machine including a monitor provided at a specified height position of a casing of the game machine for displaying images, a game control unit for controlling the progress of a game, and a display control unit for generating a simulated 3D image viewed from a viewing point of a simulated camera and displaying it on the monitor screen.

BACKGROUND OF THE INVENTION AND RELATED ART STATEMENT

In some of existing roll-playing fighting games for displaying a character of a game player and enemy characters and the like on a monitor screen, movements of the game player's feet are detected and the game player character on the monitor screen are so moved as to conform to the detected movements. There is also known a viewing point changing technique for displaying a simulated 3D car race image on a monitor screen provided before a game player seated on a car seat and changing a viewing point of a camera to a preset position according to the inclining movement to left or right or forward-bending movement of the upper half of the game player's body.

The latter viewing point changing technique, disclosed in Japanese Patent Publication Serial No. Hei 10-85451 for instance, is adapted to respond to the movements of the upper half of the game player's body seated on the seat, i.e. change an image when a preset viewing point is changed from a predetermined one to the another predetermined one selected from a plurality of predetermined viewing points. As the viewpoints were predetermined, the change from one to the other is carried out within the limited choices among the predetermined viewpoints. It is likely that the player can learn the pattern of changes in viewpoint so that he/she can predict the change pattern in viewpoint by playing the game several times, giving the player a monotonous feel towards viewpoint changes.

SUMMARY OF THE INVENTION

In view of the above prior art technique, an object of the present invention is to provide a method for controlling a viewing point of a simulated camera in a 3D video game which method enables images from a viewing point intended by a game player to be actively displayed by causing the viewing point of the simulated camera to follow a free movement of the game player, and to provide a video game machine.

In order to achieve the above object, a 3D video game machine according to the present invention comprises a monitor provided at a specified height position of a casing of the game machine for displaying images, a game control unit for controlling the progress of a game, a display control unit for generating a 3D image viewed from a viewing point of a simulated camera and displaying it on a screen of the monitor, head detecting means for detecting at least a position of the head of a game player located in a play area before the screen of the monitor in at least one linear direction in a 3D space, and viewing point changing means for moving the viewing point of the simulated camera to follow a displacing direction and a displacing amount of the detected position of the head.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
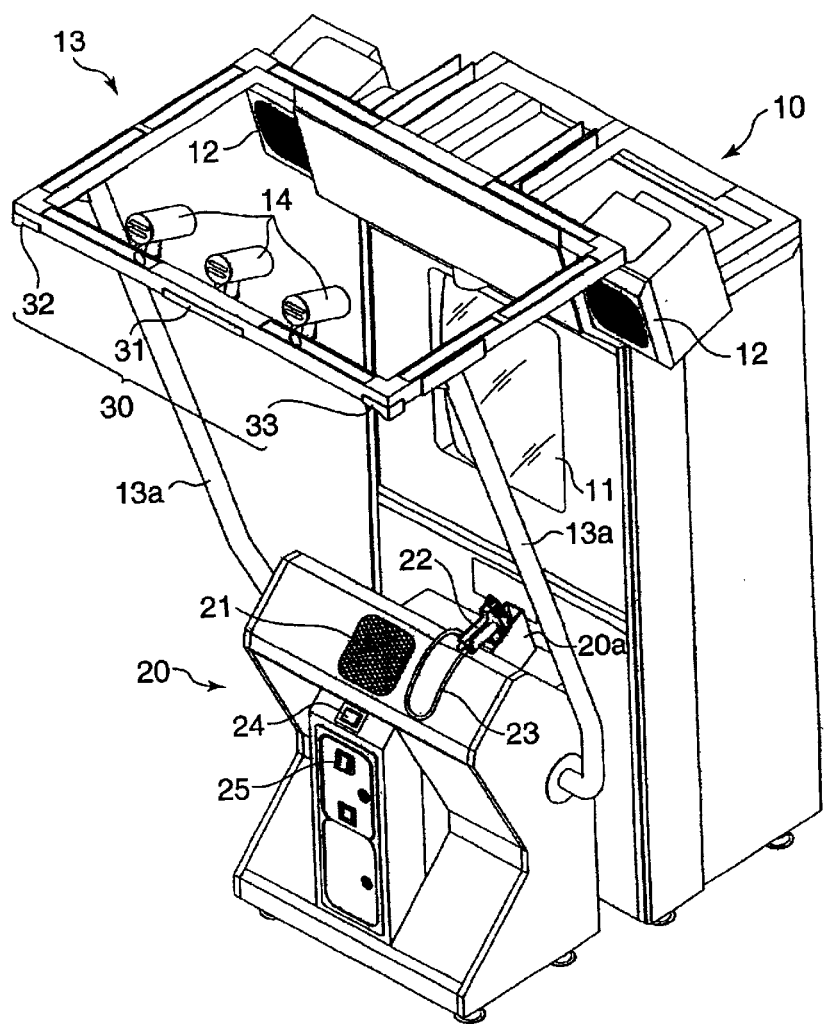
FIG. 1 is a perspective view showing one embodiment of a simulated 3D video game machine according to the present invention.

FIG. 1 is a perspective view showing one embodiment of a simulated 3D video game machine according to the present invention. This game machine is provided with a game main unit 10, an operation casing 20 integrally or detachably or individually provided in front of the game main unit 10, and a head detector 30. A play area where a game player stands to play a game is defined before the operation casing 20.

The game main unit 10 is a console box substantially in the form of a rectangular parallelepiped, and a monitor 11 of a specified size for displaying game images is provided substantially in the middle of the front surface of the game main unit 10, preferably at such a height position where the game player's head is located substantially in the middle of the screen in a usual posture of the game player playing the game. Besides a CRT, an LCD, a plasma display, a liquid crystal projector and the like can be adopted as the monitor 11. Loudspeakers 12 for presenting sound effects are provided at the top, preferably at the left and right sides of the game main unit 10, and a panel or the like on which the name of the game, etc. is inscribed is provided therebetween. A circuit board on which controllers necessary to control the gaming operation, etc. is provided inside the game main unit 10. A rectangular frame member 13 extending forward like eaves is provided at the top of the game main unit 10, and supporting arms 13a are provided between suitable positions of left and right frame pieces of the frame member 13 and the side surfaces of the operation casing 20. A specified number of, e.g. three light sources 14 for electric decoration so as to correspond to three primary colors are provided on the front frame piece of the frame member 13 in such a manner as to face toward the game main unit 10.

Figure 2:
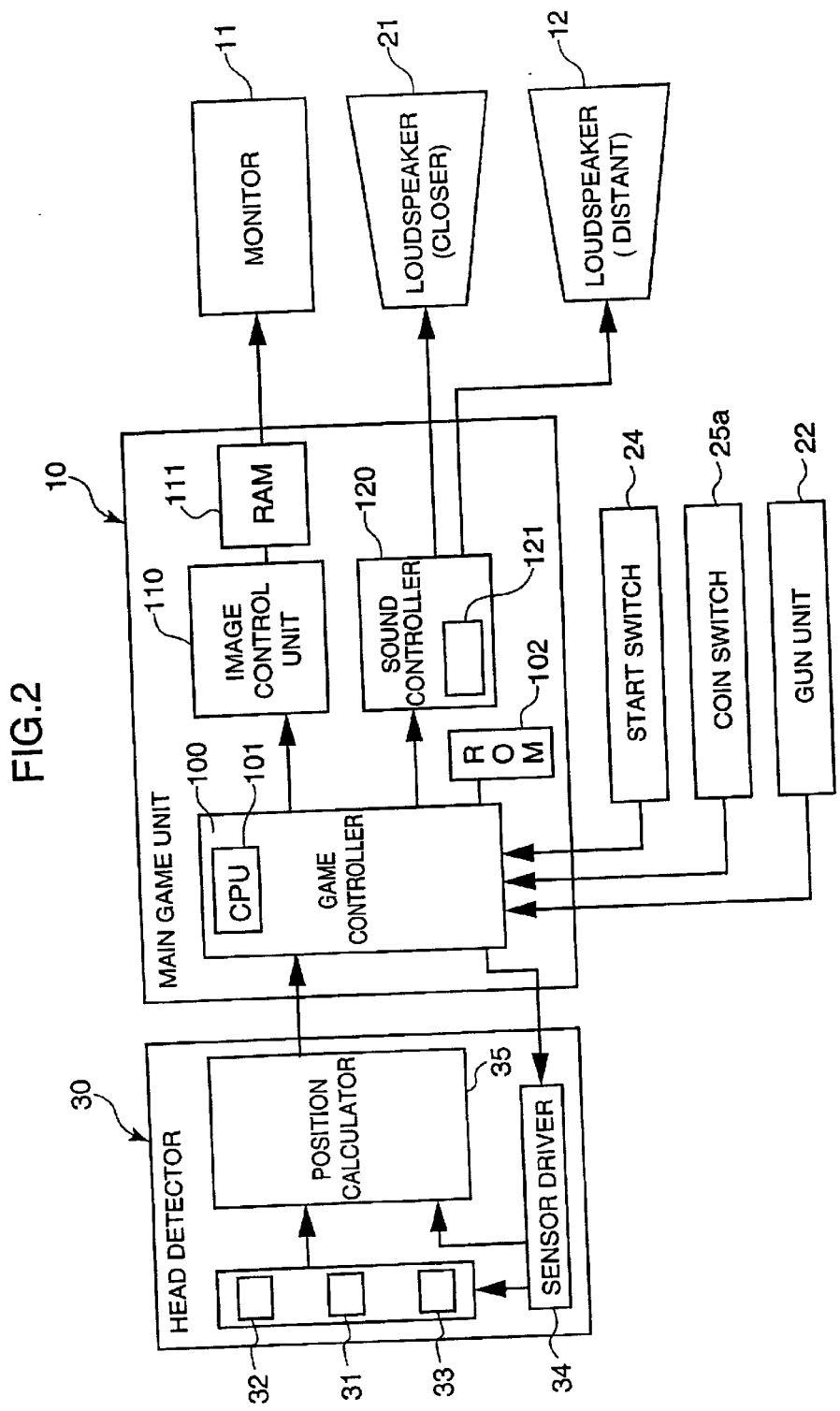
FIG. 2 is a block construction diagram of the 3D video game machine.

The frame member 13 functions as a supporting structure for the head detector 30, and is adapted to locate the head detector above the play area, i.e. above the game player's head. An ultrasonic transmitter 31 for transmitting sound waves and ultrasonic waves as propagation mediums is provided in the transverse center of the front frame piece of the frame member 13, and ultrasonic receivers 32, 33 for receiving the ultrasonic waves as propagation mediums are transversely symmetrically provided with respect to the ultrasonic transmitter 31. Besides ultrasonic waves, rays, particularly infrared rays may be used as the propagation mediums. Any of the ultrasonic transmitter 31 and the ultrasonic receivers 32, 33 is formed by a piezoelectric device or the like. The ultrasonic transmitter 31 transmits an ultrasonic pulse of a specified duration at such a width of directivity as to cover the play area and in a specified cycle of, e.g. 1/60 sec. or in such a time cycle capable of following a displacement of the game player's head at a necessary resolving power. The ultrasonic receivers 32, 33 are identically constructed and have a width of directivity sufficient to receive the ultrasonic waves transmitted from the ultrasonic transmitter 31 and reflected by the game player's head located in the play area. In the head detector 30 are provided, as shown in FIG. 2, a sensor driver 34 for supplying a drive signal (cyclical excitation pulse signal) to the ultrasonic transmitter 31, and a position calculator 35 connected with the sensor driver 34 and the two ultrasonic receivers 32, 33 and adapted to calculate the position of the game player's head in the space as described later. It should be noted that the sensor driver 34 and the position calculator 35 may be provided in the main game unit 10.

The height of the operation casing 20 is set lower than the monitor 11. A loudspeaker 21 for presenting sound effects is provided in the middle of the upper surface slightly sloped downward to the front, i.e. in a position closer to the game player than the loudspeakers 12, and a gun unit 22 simulating a gun as a game controller is provided in a specified position near the loudspeaker 21 via a cord 23 as a transmission line for control signals, etc. The gun unit 22 is stored in a containing box 20a as shown when not being used, while being held by the game player when being used, i.e. during the game to shoot the enemy characters displayed on the monitor screen as described later. A start switch 24, a coin slot 25, and the like are provided on the front surface of the operation casing 20. A coin switch 25a (see FIG. 2) for detecting the presence or absence of an inserted coin is provided in an intermediate position of a coin path connected with the coin slot 25.

FIG. 2 is a block construction diagram of the 3D video game machine. A game control unit 100, an image control unit 110 and a sound control unit 120 are mounted on the circuit board in the main game unit 10.

This game is, for example, a fighting game and assumes a battle of shooting between one or more gun-holding enemy characters displayed on the monitor screen and the game player. The enemy character displayed on the monitor screen is so controlled by the game control unit 100 as to shoot at a viewing point of a simulated camera, whereas the game player shoots the enemy character on the monitor 11 using the gun unit 22 while avoiding an attack from this enemy character.

The game control unit 100 is provided with, for example, a microcomputer (hereinafter, "CPU") 101 for controlling the progress of the game, and connected with a ROM 102 as a storage medium storing a game program such as a shooting battle game which is the game of this embodiment, the head detector 30 and other necessary elements. Besides the ROM, a ROM cassette, an optical disk, a flexible disk or the like may be used as the storage medium.

The image control unit 110 performs calculation of coordinates of the respective characters (enemy characters, various buildings and other object characters located in a game space) in a simulated 3D space when viewed from the viewing point of the simulated camera, a light source calculation, a calculation to transform the calculated coordinates in the simulated 3D space to those in a two-dimensional space, a processing to position polygons constituting an image to be formed in a display area of a RAM 111 and a texture mapping to the respective polygons. A position information transmitted from the head detector 30 as described later is used as an information on the viewing point of the simulated camera which is used in the calculation of the coordinates of the characters. Accordingly, the viewing point of the simulated camera substantially coincides with the eyes of the game player, and a character corresponding to the game player is not displayed on the screen of the monitor 11.

The sound control unit 120 reads a sound data set in the game program according to the scene of the game from a sound data storage 121 and causes the read data to be outputted as sounds from either one of the loudspeakers 12, 21. In addition to BGMs and various presentation sounds, shooting sounds, bullet-hitting sounds, sounds the stray bullets make while flying through the air, sounds the stray bullets make upon striking against obstacles displayed in front of the viewing point and other sounds are prepared as the sound data. The sound data are stored, for example, in PCM data format and are digital-to-analog converted, filtered and amplified after being read to be outputted from the loudspeakers as sounds.

In connection with the sound control unit 120, the CPU 101 is provided with a functional portion for performing a trajectory calculation. The trajectory of the bullet the enemy character displayed on the monitor screen shot at the game player by a shooting control of the CPU 101 is successively calculated based on an information on a firing position and a shooting direction by this functional portion. The image control unit 110 performs a processing of successively drawing the trajectory on the monitor screen based on the successively obtained calculation results (alternatively, only the presentation image at the time of shooting may be pictured without picturing the trajectory). Further, the sound controller 120 is provided with a functional portion for selectively switching the loudspeakers 12, 21 to output sounds according to, for example, a distance between the calculated trajectory of the bullet and the viewing point of the simulated camera as described later.

In this game, the CPU 101 is provided with a function of determining whether or not a bullet shot by the enemy character will hit the game player. This judgment is made based on, for example, whether or not any obstacle exists between the enemy character and the viewing point of the simulated camera or whether or not a distance therebetween is fairly long. Alternatively, a hit rate may be set at random and may be suitably changed according to the progress of the game, etc. or may be changed according to a life gauge of the game player. The CPU 101 is also provided with a function of decreasing the life gauge by a specified amount when the game player is shot and a function of judging whether or not the life gauge has decreased to 0.

Here, the construction and operation of the gun unit 22 is described. In this embodiment, known construction and operation principle are adopted as those of the gun unit 22. Specifically, the gun unit 22 has an outer configuration similar to that of a gun, and an operation of pulling a trigger biased toward an initial position by a biasing means is detected by detecting a linked movement of a movable piece of a switch and such a detection is introduced in the form of a shooting command signal to the game control unit 100 via the cord 23. A light detecting sensor is so built in the gun unit 22 as to have a narrow directivity at the muzzle. When the shooting command signal is introduced to the game control unit 100, the CPU 101 functioning as a shooting position detector of the game control unit 100 interrupts an imaging processing to the monitor 11, sweeps a luminescent spot in horizontal(H) and vertical (V) directions for, e.g. only one frame, and measures a time which lapses until the light detecting sensor in the gun unit 22 detects this luminescent spot after the start of sweeping. Since a sweeping period for one frame is known from an adopted sweeping method, the gun unit 22 is assumed to have faced at the calculated coordinate position, i.e. to have been fired by inversely calculating the coordinate position of the luminescent spot on the screen of the monitor 11 based on the measured time. Alternatively, a following method may be adopted. An infrared CCD camera is mounted in the muzzle, whereas one or two infrared spot light sources are arranged at fixed positions near the monitor 11. A direction in which the camera was faced, i.e. a position toward which the gun unit 22 was faced is detected based on coordinates of the spot light source(s) within an image picked up by the CCD camera when the trigger was pulled.

The CPU 101 successively calculates the trajectory of the bullet shot by the game player in the game space on the screen of the monitor 11 and judges whether or not the shot bullet has hit the enemy character displayed on the screen by preferably causing the bullet to be displayed on the screen every time calculation is made. Whether or not the bullet has hit the enemy character is judged based on the results of the successively calculated trajectory and the coordinates of the position of the enemy character, i.e. based on whether the calculated coordinates of the bullet and the coordinates of the position of the enemy character coincide or substantially coincide.

Figure 3:
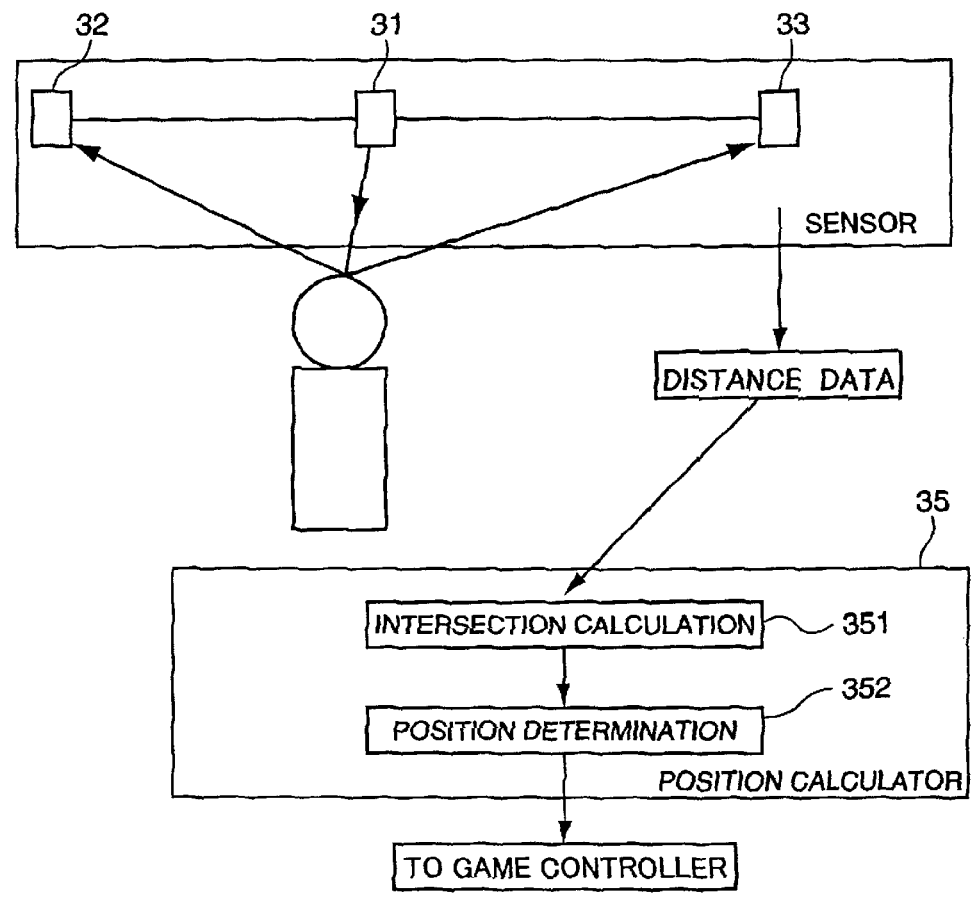
FIG. 3 is a diagram showing detection principle in a position calculator of a head detector.

Next, detection principle in the position calculator 35 of the head detector 30 is described with reference to FIG. 3. An ultrasonic pulse having a wide directivity transmitted from the ultrasonic transmitter 31 is reflected by the body of the game player located therebelow and a part of the reflected pulse is received by the ultrasonic receivers 32, 33. Since the game player's head is located at highest in his usual playing action, the pulse signals received by the ultrasonic receivers 32, 33 can be both assumed to be return waves reflected by the game player's head. The position calculator 35 measures periods which lapse until the rise of the pulse signals received by the ultrasonic receivers 32, 33 after the ultrasonic pulse was transmitted, and performs a geometric calculation using distance data obtained by converting the measured periods based on an air propagating sound velocity, distances between the ultrasonic transmitter 31 and the ultrasonic receiver 32 and between the ultrasonic transmitter 31 and the ultrasonic receiver 33, and a height information, thereby calculating the position of the game player's head in height direction and in transverse direction. Specifically, the measured periods at the side of the ultrasonic receiver 32 determine an ellipse having the ultrasonic transmitter 31 and the ultrasonic receiver 32 as foci. Likewise, the measured periods at the side of the ultrasonic receiver 33 determine another ellipse having the ultrasonic transmitter 31 and the ultrasonic receiver 33 as foci. Since the position of the ultrasonic transmitter 31 is same, a bottommost intersection of the two ellipses can be calculated (intersection calculation 351), the position of the game player's head in height direction and in transverse direction in the space can be determined using the height information of the ultrasonic transmitter 31 and the ultrasonic receivers 32, 33 (position determination 352). In order to simplify the calculations, the intersection may be calculated assuming that the game player's head is located right below the ultrasonic transmitter and receivers 31, 32, 33, i.e. only by the calculation of the ellipses. Alternatively, a relationship between the two measured periods (i.e. the two distance data) and the position of the head may be calculated in advance and may be stored in a table format (LUT). The position calculator 35 sends the thus calculated position of the game player's head in height direction and in transverse direction in the space to the game control unit 100 as the viewing point information of the simulated camera. Accordingly, the viewing point of the simulated camera can be so changed or moved as to correspond to the position of the game player's head, i.e. follow a displacing amount and a displacing direction of the position of his head.

Figure 4A:
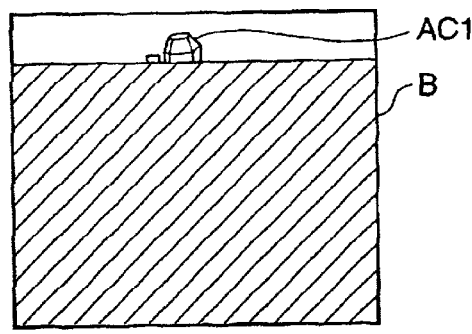
FIGS. 4A to 4D are diagrams showing one example of a change of a viewing point of images on a monitor screen when a game player's head is vertically moved.
Figure 4B:
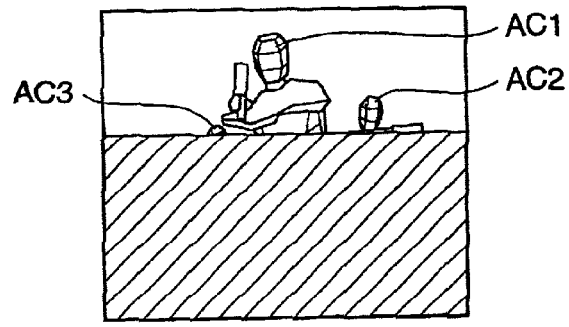
Figure 4C:
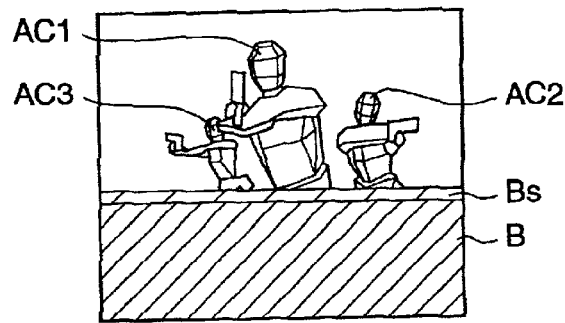
Figure 4D:
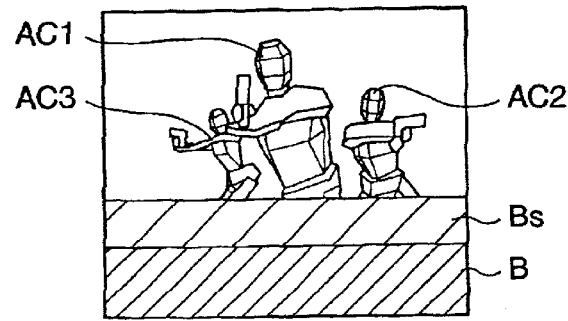
Figure 5:
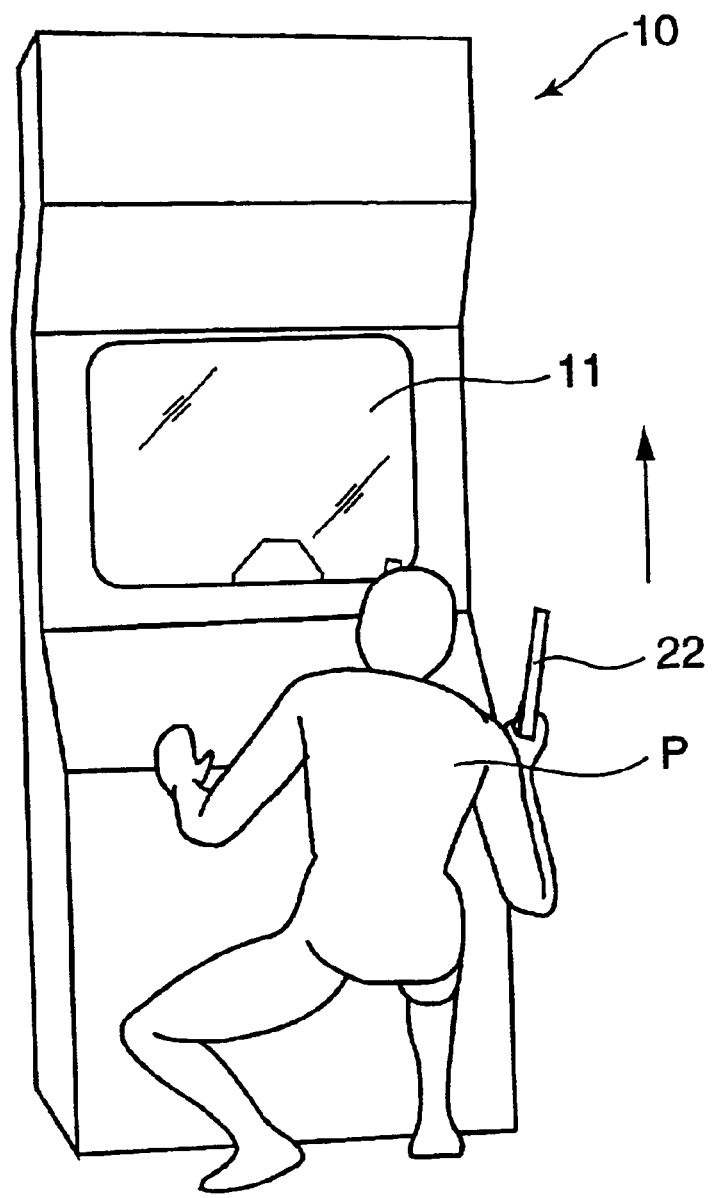
FIG. 5 is a diagram showing a game playing state of the game player.

FIGS. 4A to 4D are diagrams showing one example of a change of the viewing point of images on the monitor screen when the game player's head is vertically moved, and FIG. 5 is a diagram showing a game playing state of the game player. FIGS. 4A to 4D correspond to a lapse of time and show four scenes when the game player gradually rises from a half-sitting posture (see FIG. 5) to a substantially upright posture in a direction of an arrow in front of the main game unit 10, i.e. the game player's head (eyes) is displaced upward from below. FIG. 4A shows a state where there is an obstacle B like a desk right in front of the viewing point, the game player hides himself before the obstacle B at the front side, and part of the head of an enemy character AC1 holding a gun is seen behind the obstacle B. The scene shown in FIG. 4B is reached when the game player slightly lifts his head from the state of FIG. 4A, and shows that only the eyes of the game player are in alignment with the upper surface of the obstacle B, the enemy character AC1 is seen up to his chest, and two other enemy characters AC2, AC3 are newly seen behind the enemy character AC1. The scene of FIG. 4C is reached when the game player straightens his back to further lift his head, and shows that the eyes of the game player are slightly exposed from the upper surface Bs of the obstacle B, the upper halves of the bodies of the three enemy characters AC1, AC2, AC3 are seen and the upper surface Bs of the obstacle B is also slightly seen. The scene of FIG. 4D is reached when the game player stands upright, and shows that the game player is exposed from the obstacle B up to his neck and the upper surface Bs is more widely seen. As the eyes of the game player rise, the upper surface Bs of the obstacle B is gradually lowered as shown in FIGS. 4A to 4D.

Figure 6A:
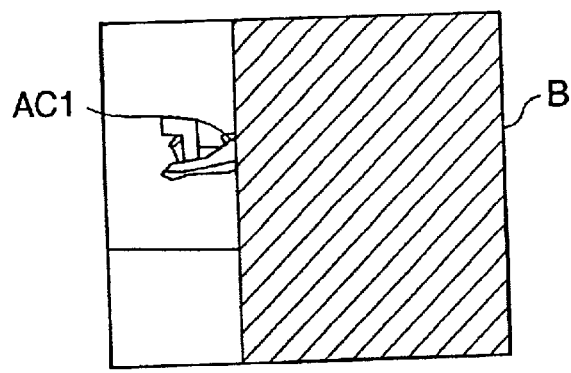
FIGS. 6A to 6D are diagrams showing one example of a change of the viewing point of images on the monitor screen when the game player's head is transversely moved.
Figure 6B:
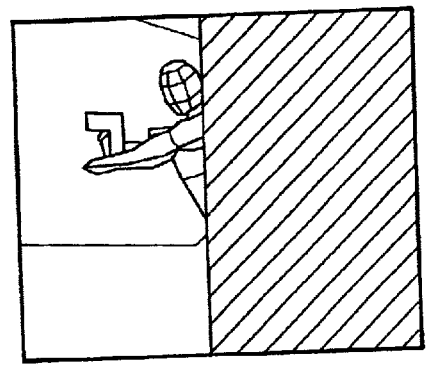
Figure 6C:
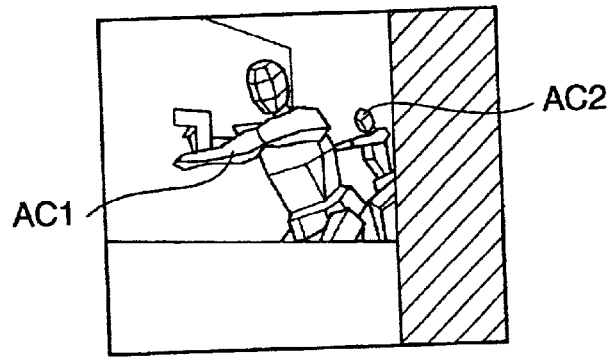
Figure 6D:
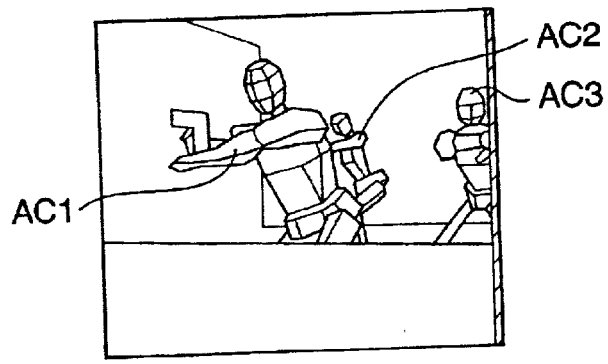
Figure 7:
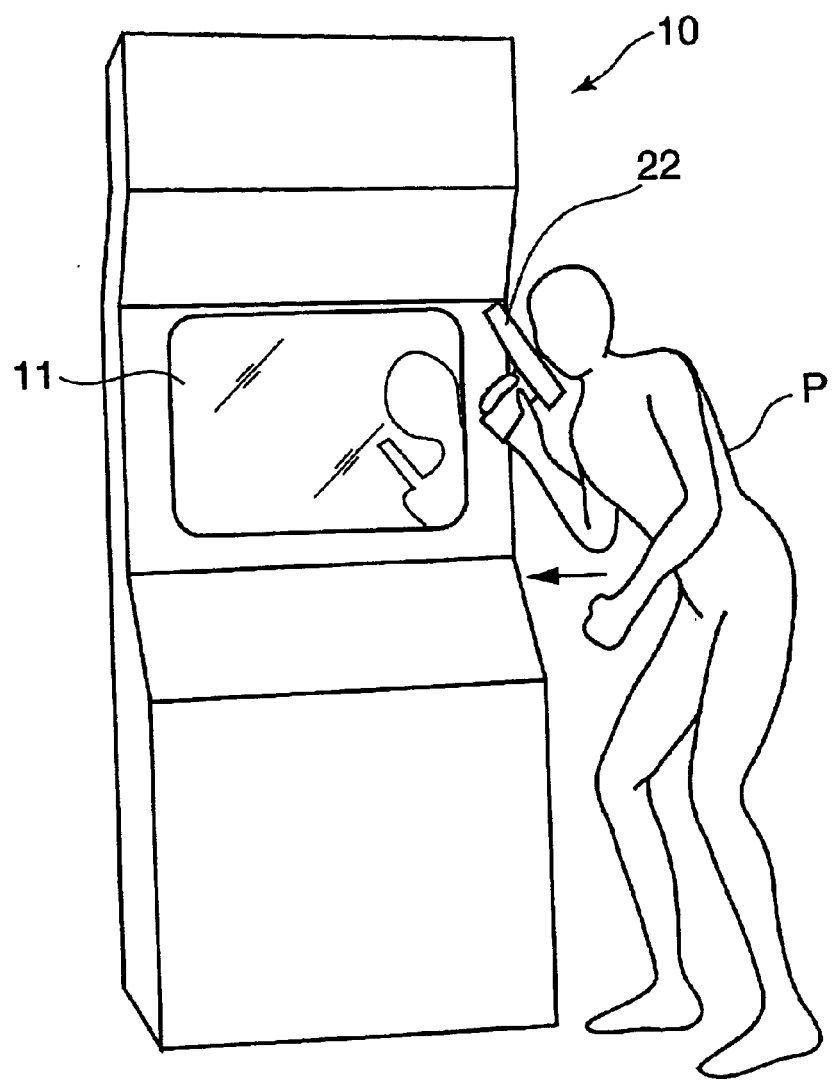
FIG. 7 is a diagram showing a game playing state of the game player.

FIGS. 6A to 6D are diagrams showing one example of a change of the viewing point of images on the monitor screen when the game player's head is transversely moved, FIG. 7 is a diagram showing a game playing state of the game player. FIGS. 6A to 6D correspond to a lapse of time and show four scenes when the game player gradually is moved to left in a direction of an arrow from the right side (see FIG. 7) of the main game unit 10, i.e. the game player's head (eyes) is displaced leftward from right. FIG. 6A shows a state where an obstacle B like a door or a wall exists right in front of and on the right side of the viewing point, the game player hides himself behind the obstacle B, and part of an arm of the enemy character AC1 holding a gun is seen on the other side of the obstacle B. The scene of FIG. 6B is reached when the game player slightly moves his head to left from the state of FIG. 6A, and shows that only the eyes of the game player are slightly exposed from the left end of the obstacle B and the face and the chest of the enemy character AC1 can be seen. The scene of FIG. 6C is reached when the game player further moves his head to left, and shows that the game player's head is slightly more exposed from the left end of the obstacle B, the upper half of the body of the enemy character AC1 is seen and part of another enemy character AC2 is newly seen behind the enemy character AC1. The scene of FIG. 6D is reached when the game player jumps to left from the obstacle B to expose the upper half of his body, and shows that still another enemy character AC3 is seen in addition to the two enemy characters AC1, AC2.

Since the head detector 30 can detect the vertical and transverse positions of the game player's head, when his head moves while having components of two directions, i.e. vertical direction and transverse direction, the viewing point can be moved accordingly, i.e. in an oblique direction.

Figure 8:
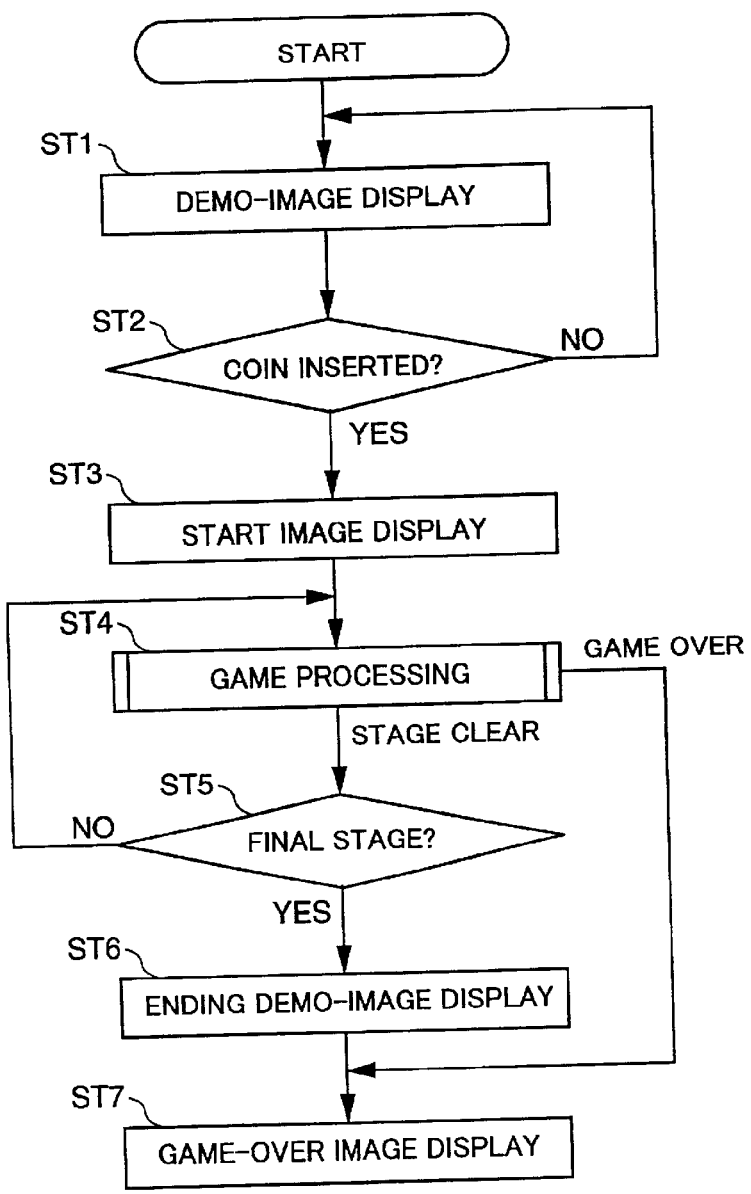
FIG. 8 is a flow chart showing an example of a game progress processing executed by a CPU.

FIG. 8 is a flow chart showing an example of a game progress processing executed by the CPU 101. When the game machine is turned on, the main routine starts, whereby a demonstration screen is first displayed on the monitor 11 (Step ST1). When insertion of a specified coin is detected by the coin switch 25a (YES in Step ST2), a start screen is displayed (Step ST3) and the gaming processing as a shooting game is executed (Step ST4). In a mode wherein the game is comprised of a specified number of stages, a judgment is made as to whether a specified condition is not met during each stage. For example, an judgment is made by the control of the CPU 101 functioning as a life game administering means as to whether the life gauge displayed in, for example, an upper area of the screen of the monitor 11 has decreased to a specified value or below, e.g. to 0. If a condition such as shooting all enemy characters appearing during the stage is cleared before the life gauge reaches 0, it is discriminated whether the next stage is a final stage (Step ST5). Conversely, if the life gauge reaches 0 during the game, the display content on the monitor 11 is switched to a game-over screen, thereby forcibly ending the game.

On the other hand, if the cleared stage is a final stage, an ending demonstration screen presenting a commendation is displayed (Step ST6) and the game-over screen is displayed (Step ST7) after displaying scores or the like if necessary, thereby ending the game.

Figure 9:
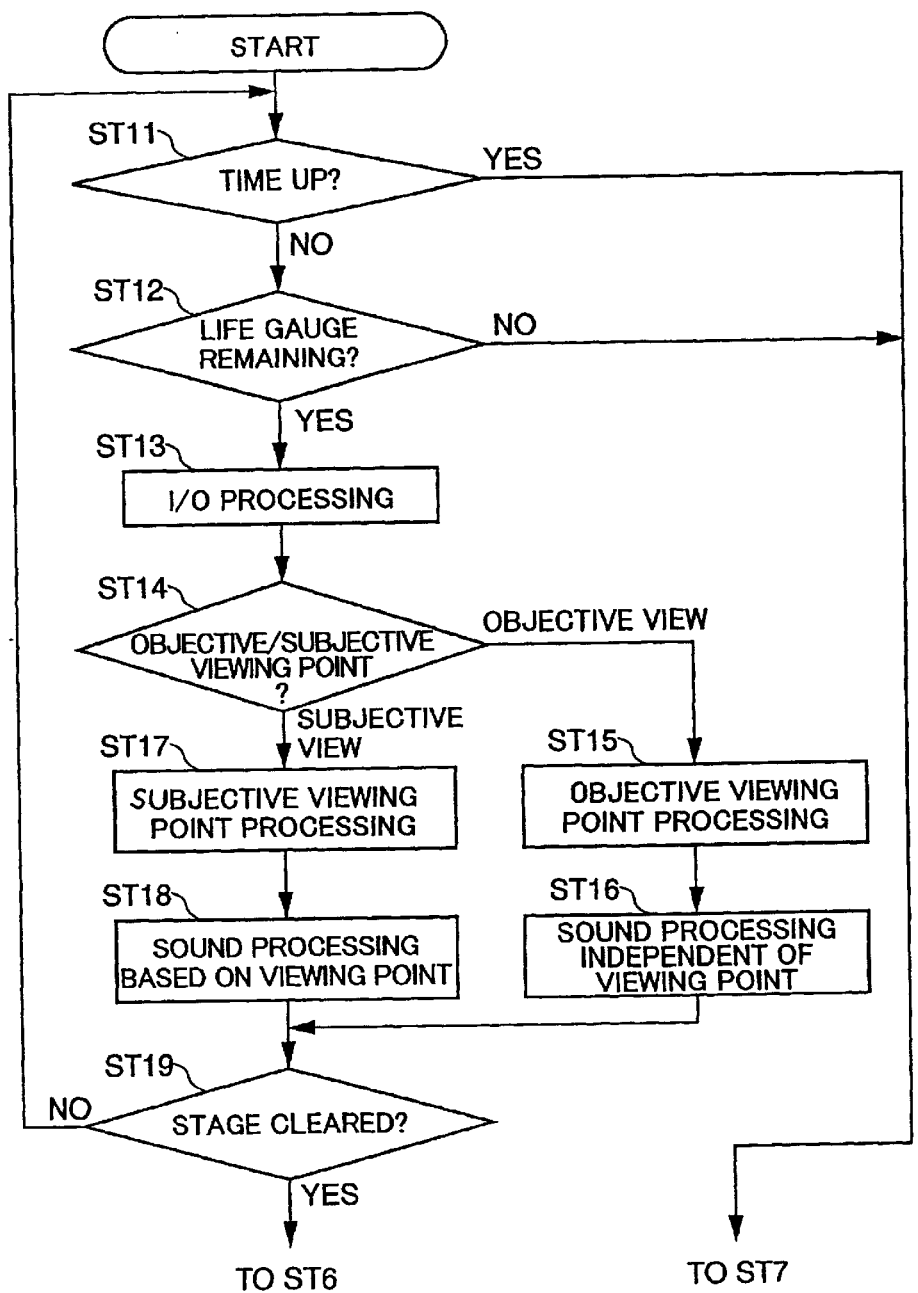
FIG. 9 is a flow chart showing a subroutine "Gaming Processing" executed in Step ST4.

FIG. 9 is a flow chart showing a subroutine "Gaming Processing" executed in Step ST4. During the gaming processing, a judgment is made as to whether or not a gaming time set for each stage and measured by a built-in timer has elapsed (Step ST11) and then it is discriminated whether there still remains any life gauge (Step ST12) if the gaming time has not elapsed yet. If the discrimination results in both Steps ST11, ST12 are negative, Step ST7 follows. On the other hand, if there still remains some life gauge, an I/O processing is executed, i.e. an information on the position of the game player's head, i.e. an information substantially on the positions of the game player's eyes is transferred from the head detector 30 (Step ST13).

It is then discriminated whether the current viewing point is an objective viewing point or a subjective viewing point (Step ST14). In this game, during a certain period at the beginning of each stage, the CPU 101 functioning as an objective/subjective viewing point switching means and the timer causes an overall situation of the game space, i.e. an image of a wide area to be displayed by retracting the simulated camera to include the player character so that the game player can grasp and recognize where he is in the game space. During this period, the viewing point is set at the subjective viewing point. On the other hand, upon completion of the imaging processing by the subjective viewing point, the viewing point is switched to the objective one based on the game player's eyes. In Step ST14, if the viewing point is the subjective one, the game image is formed at the viewing point independent of the information obtained by the I/O processing (Step ST15), and if a shooting battle occurs, an interrupt processing for the sound control starts to output the respective sounds relating to shooting from the loudspeakers 12 (or both the loudspeakers 12 and 21) (Step ST16).

On the other hand, if the viewing point is switched to the objective one, the game image is formed at the objective viewing point based on the information obtained by the I/O processing (Step ST17), and if a shooting battle occurs, the respective sounds relating to shooting are separately outputted from the loudspeakers 12 or the loudspeaker 21 by the interrupt processing (Step ST18). Upon completion of the sound processing in Steps ST16, ST18, it is discriminated whether the current stage has been completed. Unless the current stage has been completed, this subroutine returns to Step ST11 and the operations of Steps ST11 to ST18 are repeated. If it has been completed, this subroutine returns to Step ST6 to exit therefrom.

Figure 10:
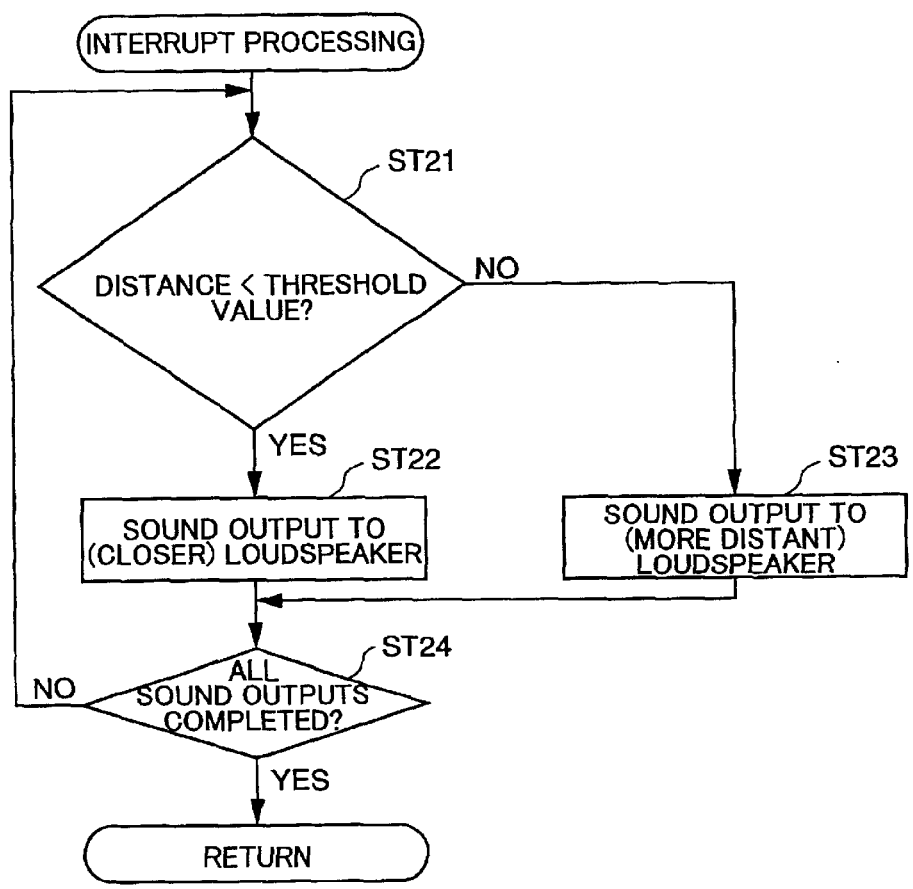
FIG. 10 is a flow chart showing a sound processing in response to shooting from enemy characters in a subroutine "Sound Processing based on a Viewing Point" executed in Step ST18.

FIG. 10 is a flow chart showing an "Interrupt Processing" in response to shooting from the enemy character in a subroutine "Sound Processing based on a Viewing Point" executed in Step ST18. In FIG. 10, the interrupt processing for the sound output is started upon firing by the enemy character, and it is discriminated whether a distance in the game space between the object which is supposed to make sounds (sound-making object) and the viewing point is smaller than a threshold value used in judging a long or short distance (Step ST21). The sound-making object may be a bullet fired by the enemy character or an obstacle which is located before the viewing point and on which the fired bullet hits. Specifically, when the bullet from the enemy character hits the obstacle before the viewing point, hitting sounds are outputted from the loudspeaker 21 (Step ST22) if the distance to this obstacle is smaller than the threshold value (if it is close) while being outputted from the loudspeakers 12 (Step ST23) if the distance is larger than the threshold value (if it is distant).

The sound control unit 120 is provided with a function of judging that the fired bullet passed such a point very close to the viewing point that the bullet is assumed to have hit the game player based on the result of distance between the position of the bullet successively obtained by the trajectory calculation and the viewing point. Upon making such a judgment, the sound controller 120 executes such a presentation as to, for example, temporarily shake the screen, decreases the life gauge by a specified value as a hit processing to the game player (hit-presentation processing) and causes the hitting sounds to be outputted from the loudspeaker 21 (Step ST22). If the fired bullet hits neither the obstacle in front of the viewing point nor the game player, a sound of the bullet hurtling through the air is outputted from the loudspeaker 21 at a timing when the calculated distance between the position of the bullet whose trajectory is successively calculated and the viewing point becomes smaller than the threshold value (Step ST22). Although other sound effects relating to shooting are outputted from the loudspeakers 12, the shooting sounds from the game player may be, for example, outputted from the loudspeaker 21. As described above, the output of the sounds is switched such that the sounds are outputted from the loudspeakers 12 more distant from the game player if the sound-making object is distance from the viewing point, whereas they are outputted from the loudspeaker 21 if it is close to the game player. Thus, a game having an acoustically better presence can be provided.

Upon completion of the sound output processing for a certain sound, it is then discriminated whether the sound output processing for all sounds has been completed, i.e. whether any presentation (hitting on the obstacle before the viewing point, hitting on the game player or missing the game player by passing right beside him) in response to one fired bullet has occurred (Step ST24). Step ST21 follows if no presentation has occurred, whereas this subroutine returns on the assumption that the sound output processing for this bullet has been completed if some presentation has occurred. It should be noted that the number of the loudspeaker 21 is not limited to one, and two loudspeakers 21 may be arranged side by side. In such a case, sounds may be outputted while switching the left and right loudspeakers according to whether the game player's head is located at the left or right side within the play area or a further better acoustic presence may be provided by, for example, the switching of the acoustic effect in transverse direction in addition to the switching thereof according to the distance by adjusting a volume ratio to conform to the situation.

Figure 11:
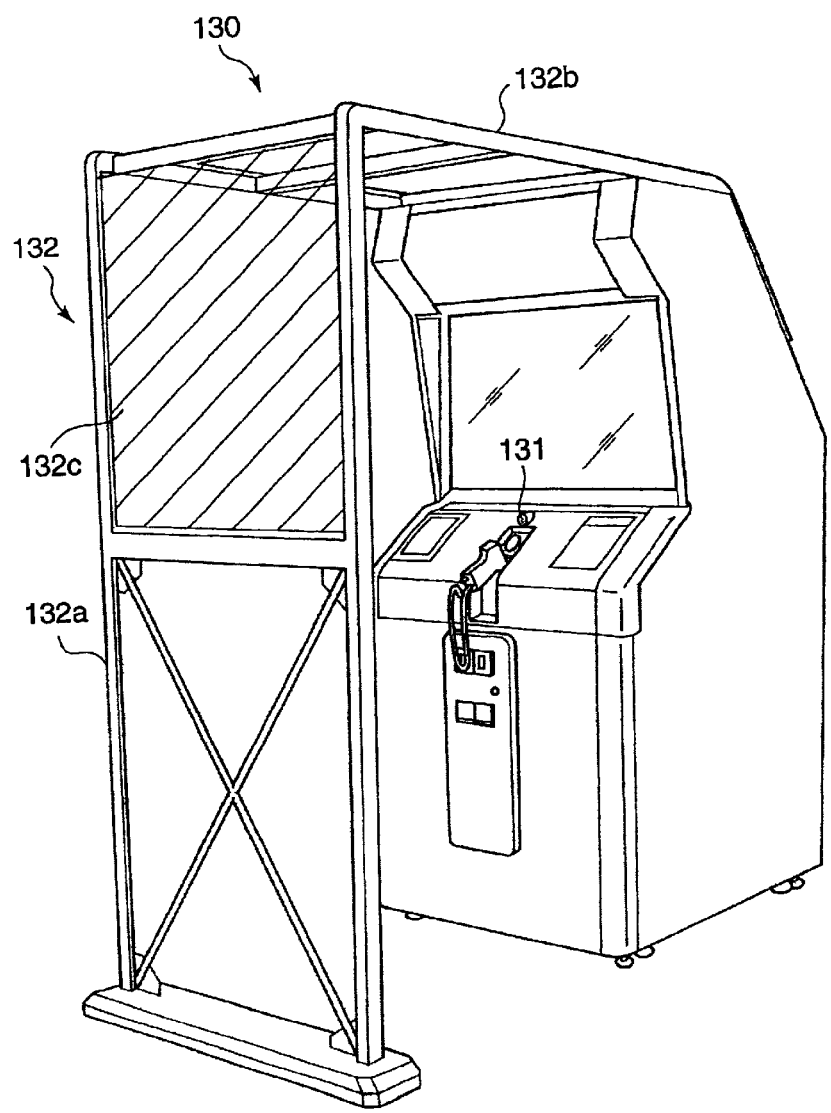
FIG. 11 is a perspective view showing a second embodiment of the 3D video game machine according to the present invention.
Figure 12:
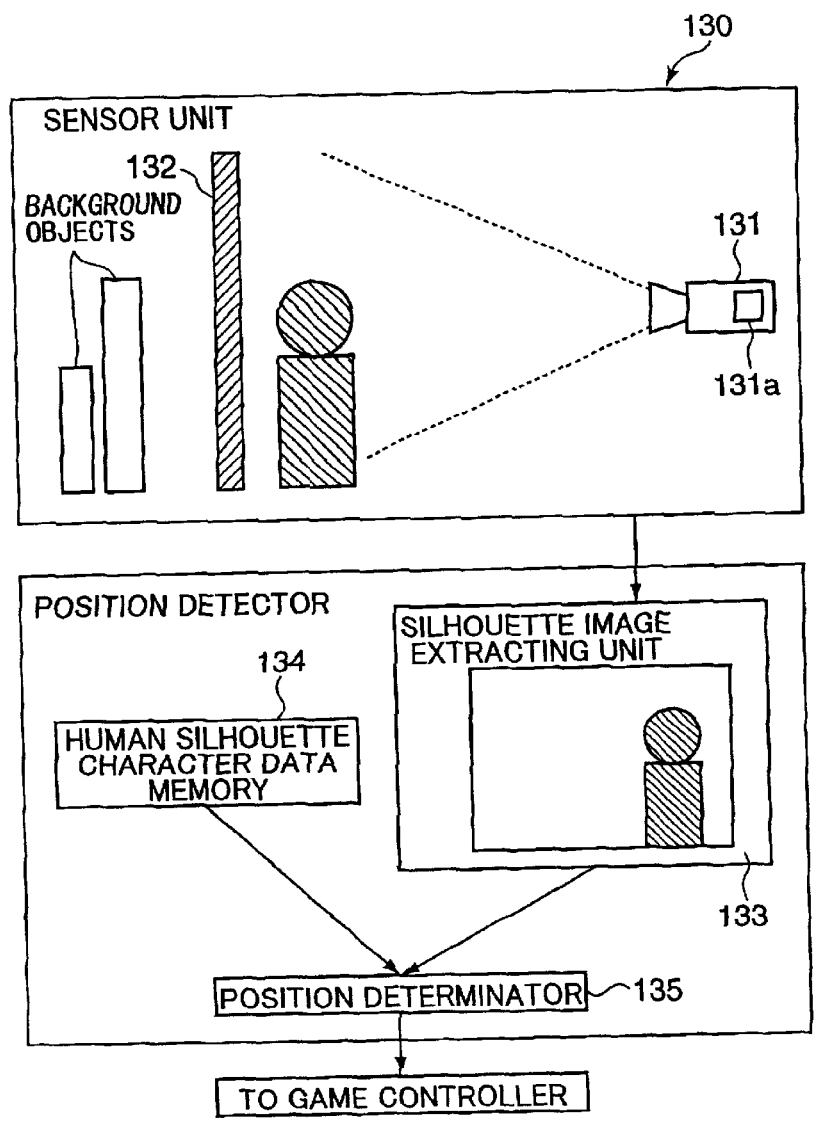
FIG. 12 is a block diagram showing detection of a game player's head in the game machine shown in FIG. 11.

FIG. 11 is a perspective view showing a second embodiment of the 3D video game machine according to the present invention, and FIG. 12 is a block construction diagram for the detection of the game player's head. Although this game machine is slightly different from the one shown in FIG. 1 in appearance, the two game machines are substantially identical in function except the construction of the head detector 30.

In the second embodiment, a head detector 130 is comprised of, for example, a CCD camera 131 as an image pickup means arranged right below the monitor 11 and in a transversely center position, a background deleting member 132 provided at a side of the play area opposite from the CCD camera 131, a silhouette image extracting means 133 as a functional portion, a human silhouette characteristic data memory 134 for storing a human silhouette characteristic data and a position determining device 135. The CCD camera 131 is oriented such that its side toward the play area serves as an image sensing area.

The background deleting member 132 includes a rectangular support 132a standing at the front side as if it would surround the play area, an upper horizontal coupling arm 132b to be coupled with the main game unit 10 to hold the support 132a upright, and a screen 132c having a stripe pattern of a specified single color such as blue, a two-color stripe pattern or the like adhered to the upper half of the support 132a on its outer surface. The screen 132c is of such a size and a form, preferably a rectangular form as to cover a range where the game player's head can be possibly displaced in a usual gaming posture and is provided at such a height position as to cover his head regardless of whether the game player is in his bending posture or in his upright posture. The screen 132c may be semitransparent, so that people standing behind the screen 132c can see the game player's movements and images displayed on the monitor 11.

The CCD camera 131 has such an angle of view that the screen 132c becomes a visual field, so that background objects (e.g. various objects at an amusement arcade (other game machines, etc.) and people) behind the screen 132c are not included in a picked image. Preferably, the CCD camera 131 is a color image pickup means in which filters of respective colors of red, green and blue are arranged on the front surfaces of CCDs. The CCD camera 131 picks up an image on the screen 132c in a specified cycle of, e.g. 1/60 sec. or in such a time cycle capable of following a displacement of the game player's head at a specified resolving power, and stores the picked images in an image memory 131a provided therein while being administering them by addresses. The silhouette image extracting device 133 extracts a human silhouette by executing such a processing to delete a blue image from an image data stored in the image memory 131a and including images of the game player and the screen 132c behind the game player. This extraction processing can be performed by simply handling a blue area as a data nonexistent area. Further, in a mode where the screen 132c has a stripe pattern, a processing to delete such a basic pattern area may be performed.

The position determining device 135 extracts the head from the human silhouette based on the human silhouette obtained by the silhouette image extracting device 133 and the human silhouette characteristic data stored in the human silhouette characteristic data memory 134 using a pattern recognition technique or like technique, calculates the positions of the eyes at the head, e.g. a center position of the head area and determines the position assuming that the calculated position is the position of the game player's eyes. The obtained position information is sent to the game control unit 100 and then used as a viewing point information as in the first embodiment.

Besides the head detectors 30, 130 of the first and second embodiments, the head detector of the present invention may be embodied as follows.

(1) The CCD camera of the head detector 130 in the second embodiment may be converted into an infrared camera by providing an infrared filter on the front surface of a CCD sensing surface, an infrared light source for irradiating infrared rays in such a range as to cover the screen 132c may be provided in proximity to the infrared camera, and a material for absorbing the infrared rays may be applied, for example, to the front surface of the screen 132c. With this construction, an image pickup area of the screen 132c has a low luminance since no reflected light is returned from the screen 132c and, accordingly, the infrared camera can emphasize a difference in brightness between the image pickup area and a reflecting area of the game player. Thus, the human silhouette can be easily extracted. On the other hand, a material for reflecting the infrared rays may be applied, for example, to the front surface of the screen 132c. With this construction, the image pickup area of the screen 132c has a high luminance since the infrared rays are strongly reflected by the screen 132c and accordingly the infrared camera can emphasize a difference in brightness between the image pickup area and a reflecting area of the game player. Thus, the human silhouette can be easily extracted.

Further, a screen on which areas made by the infrared ray reflecting material and those made by the infrared ray absorbing material may be alternately arranged as in a stripe pattern may be used. With such a screen as well, the human silhouette can be easily extracted as in the case of the strip pattern of the second embodiment.

Figure 13:
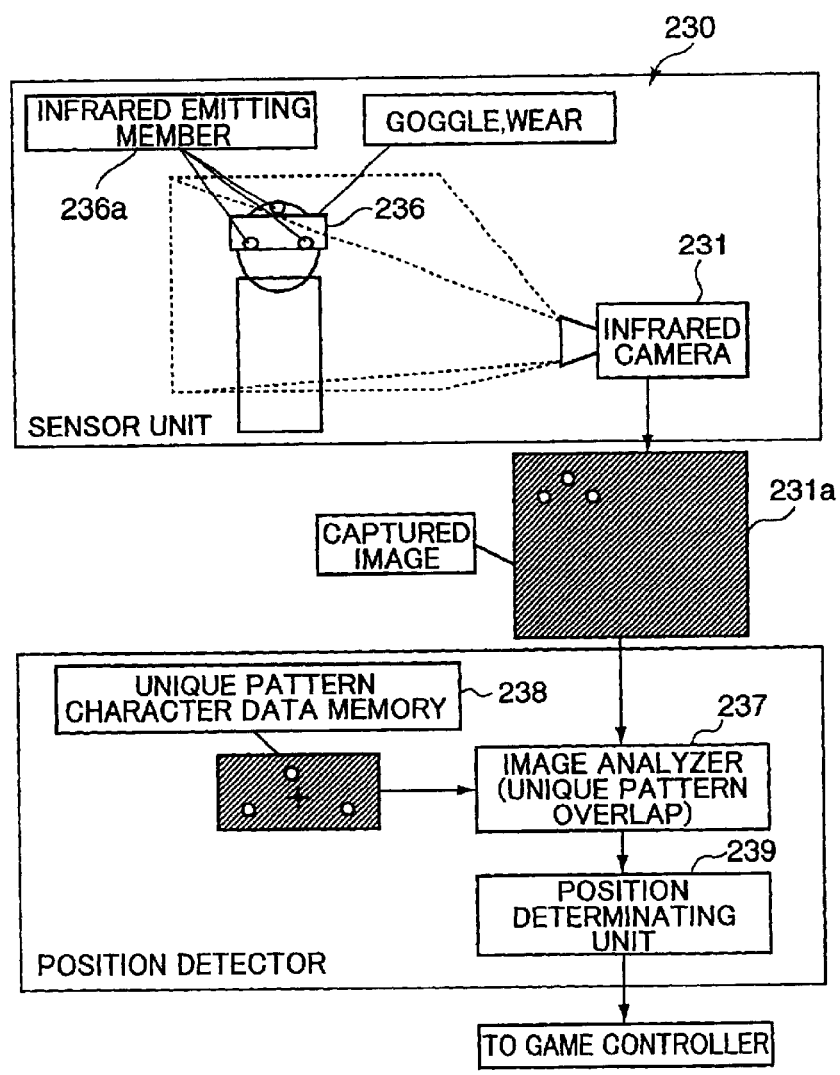
FIG. 13 is a block diagram showing another embodiment of a head detector.

(2) FIG. 13 is a block diagram showing another embodiment of the head detector. A head detector 230 has an infrared camera 231 as described in (1) and a structural element mountable on the game player's face or head. A goggle or a head fitting element 236 having a specified number of, e.g. three spot infrared ray emitting elements 236a for emitting an infrared ray is provided on the front side of the structural element. An image memory 231a, an image analyzer 237, a unique pattern characteristic data memory 238 and a position determining device 239 are provided in a processing unit of the head detector 230. When an image of the game player is picked up by the infrared camera 231, image data of three luminous points are stored in the image memory 231a, and an image pattern made up of these three points is compared with a data in the unique pattern characteristic data memory 238 by the image analyzer 238 to specify storage positions in the image memory 231a, i.e. addresses. The position determining device 239 calculates the position of the game player's eyes based on three pieces of address information in accordance with a preset equation and sends the calculated position to the game control unit 100. Although the number of the infrared ray emitting members 236a is set at 3, the position of the game player's eyes is substantially detectable if at least one infrared ray emitting member 236a is provided. Particularly, if two or more infrared ray emitting members 236a are provided, there is an advantage of more precisely determining the position of the game player's eyes since the inclination of the head or face can be simultaneously detected.

A specified number of reflectors for reflecting the infrared rays may be provided on the head fitting element 236 instead of the infrared ray emitting members 236a, and an infrared ray emitting means having a wide irradiation range at a side of the main game unit 10 may be provided, so that the infrared camera 231 can sense the rays reflected by the reflectors. This arrangement brings about the same effects as above and has an additional effect of making the head fitting element 236 lighter since it needs not be provided with a power source, a driving means, etc. for emitting the infrared rays.

Figure 14A:
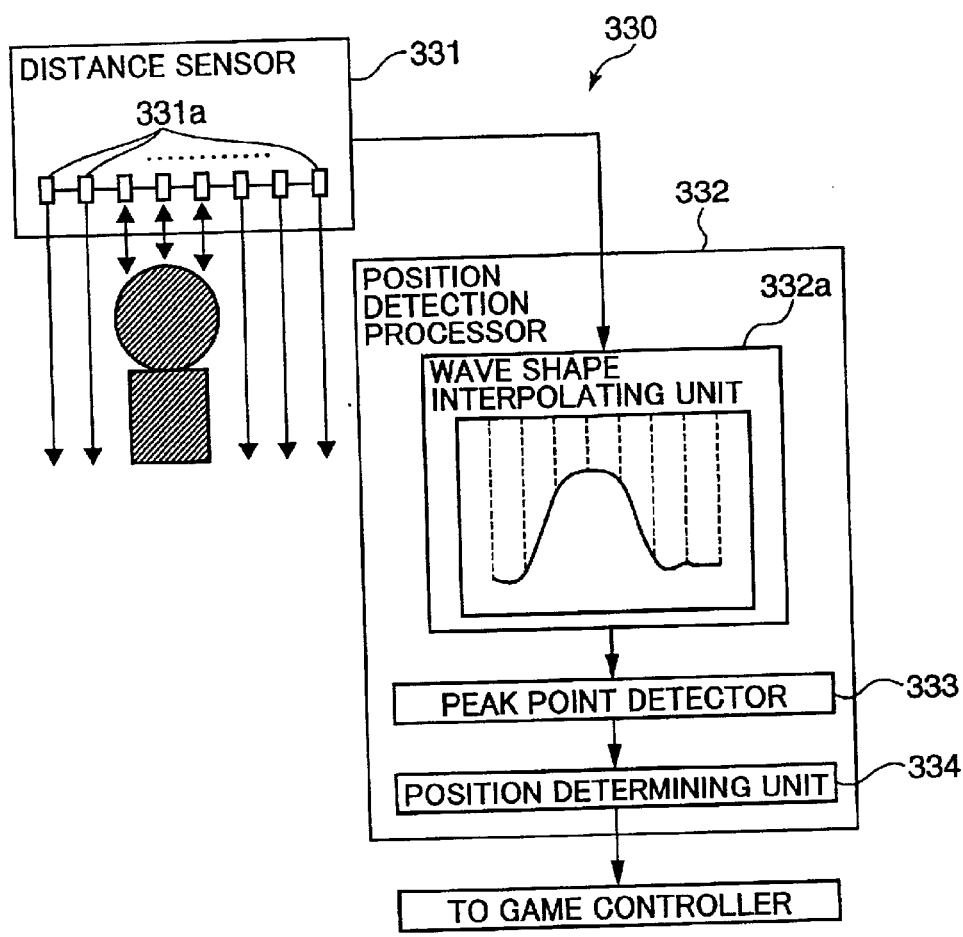
FIG. 14A is a block diagram showing still another embodiment of the head detector and FIG. 14B is a graph for the explanation of position determination.
Figure 14B:
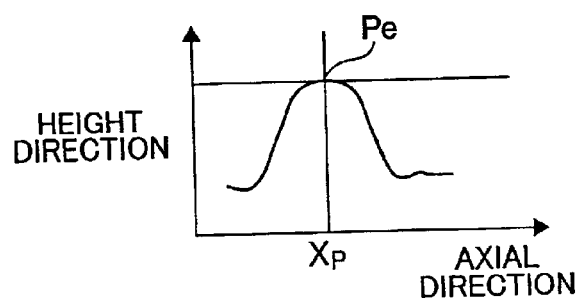

(3) FIGS. 14A and 14B show still another embodiment of the head detector, wherein FIG. 14A is a block diagram and FIG. 14B is a diagram for the explanation of the position determination.

A head detector 330 is provided with a distance measuring sensor 331 including a plurality of ultrasonic transmitting and receiving devices 331a transversely arranged at specified intervals above the play area, and a position detector 332, a peak point detector 333 and a position determining device 334 are provided in a processing unit thereof. Each ultrasonic transmitting and receiving device 331 includes at least a piezoelectric device, an exciting device for exciting the piezoelectric device by a pulse signal to cause it to send an ultrasonic pulse, a receiving device for receiving a reflected wave, and a circuit for switching signal input/output directions. The distance measuring sensor 331 may be a reflection type optical sensor (preferably infrared sensor) provided with a light emitting element and a light detecting element. The respective ultrasonic transmitting and receiving devices 331a of the distance measuring sensor 331 are so constructed as to have a width of directivity toward right below, so that the head of the game player in the play area can be detected by any (preferably two or more) of the ultrasonic transmitting and receiving device(s) 331a. Alternatively, the ultrasonic transmitting and receiving devices 331a are mounted at intervals narrower than the width of a head having a standard size.

Although the ultrasonic transmitting and receiving devices 331a may simultaneously transmit ultrasonic waves, they may successively do so at a high speed or at least every other ultrasonic transmitting and receiving device 331a may alternately do so for detection in order to prevent mutual interference of neighboring ultrasonic transmitting and receiving devices 331a. Since an ultrasonic beam having a narrow directivity provides a shortest distance data when it is received by the ultrasonic transmitting and receiving device 331a which sent it, there is no particular problem in specifying the ultrasonic transmitting and receiving device 331a having the shortest distance data even if the waves are interfered upon being received by the neighboring ultrasonic transmitting and receiving devices 331a.

As shown in FIGS. 14A and 14B, the return waves reflected by the game player's head are received by the same ultrasonic transmitting and receiving devices 331a, and the position detector 332 calculates distances based on periods which elapse from points of time of transmission to points of time of reception using a sound velocity information. In this way, a relationship (as shown in a graph 332a) in data between the interval of the ultrasonic transmitting and receiving devices 331a and the distance can be obtained. The peak point detector 333 detects a height position Pe and a transverse position Xp of a peak point as shown in FIG. 14B from the data on the interval and the distance. Since a graph is convex in height direction as shown in FIG. 14B, the peak point detector 333 can detect the peak point even if the peak point is located between the two ultrasonic transmitting and receiving devices 331a by providing the position detector 332 with a function of generating a continuous data using a model function prepared in advance. The position determining device 334 can determine the height position of the game player's eyes by subtracting a specified value from the detected height position Pe of the top of the game player's head and the transverse direction based on the arrangement interval of the ultrasonic transmitting and receiving devices 331a. An information on the height position and the transverse position of the game player's eyes thus obtained is sent to the game control unit 100.

Figure 15:
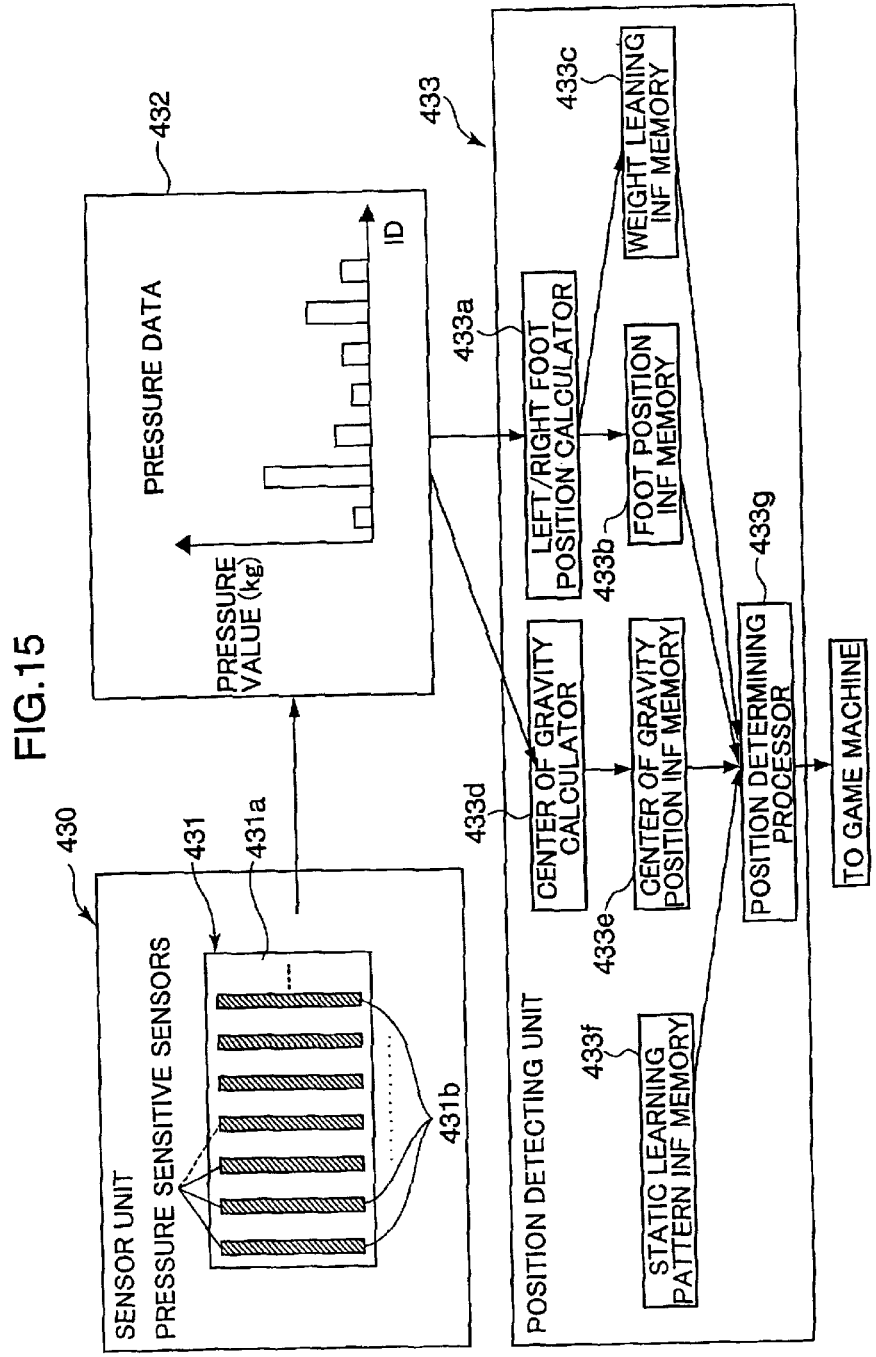
FIG. 15 is a chart showing further another embodiment of the head detector.

(4) FIG. 15 is a diagram showing further another embodiment of the head detector. A head detector 430 is provided with a pressure-sensitive sheet member 431 laid on the play area and is adapted to detect the positions of both feet of the game player and determine the position of the head using this information and other pieces of information to be described later.

The pressure-sensitive sheet member 431 is constructed such that sensors elongated in forward and backward directions are transversely arranged side by side at intervals at least narrower, preferably sufficiently narrower than the width of the game player's feet (in FIG. 15, large intervals are drawn in an exaggerated manner in order to facilitate description and drawing). A known sheet member can be adopted as the pressure-sensitive sheet member 431. For instance, the sheet member 431 is fabricated by printing elongated pressure-sensitive conductive ink portions 431b formed of, for example, a thermoplastic resin in which a pressure-sensitive conductive ink obtained by diffusely mixing conductive particles and nonconductive particles at corresponding positions of facing surfaces of two flexible film bases 431a and then adhering the two film bases 431a together. Lead wires (thermoplastic resin in which conductive particles such as silver particles are diffusely mixed) provided with insulation coatings are drawn from the respective pressure-sensitive ink portions 431b to the outside the film. A specified voltage is applied to the lead wires of one film base 431a, and a circuit for detecting the voltage is so connected with the lead wires of the other film base 431 that it can recognize the respective lead wires. Fine irregularities (resulting from the presence of fine particles during printing) are formed on contact surfaces of the pressure-sensitive ink portions 431b of the both film bases 431a put together. The voltage appearing in the lead wires of the other film 431a can be detected in an analog manner by a substantial change in the contact areas of the ink surfaces by application of a pressure on the film bases 431a, i.e. a change in resistance on the contact surfaces.

In a pressure data memory 432, voltage values detected by the voltage detecting circuits for the individual pressure-sensitive ink portions 431b, i.e. pressure data are stored in correspondence. In FIG. 15, stored contents are represented as a distribution curve. A left/right foot position detector 433a calculates an information on the positions of the respective feet of the game player in transverse direction on the pressure-sensitive sheet member 431 by obtaining a center of an area where loads from the left and right feet can be judged based on the stored contents of the pressure data memory 432. The calculated position information is stored in a foot position information memory 433b. The left/right foot position detector 433a also adds the pressure data within the foot area for each foot and stores added values in a weight leaning information memory as a weight leaning information.

A center of gravity calculator 433d calculates a center of gravity position of the loads on the pressure-sensitive sheet member 431 with respect to transverse direction, i.e. a waist position of the game player based on the contents stored in the pressure data memory 432, and a calculation result is stored in a center of gravity position information memory 433e. In a statistical learning pattern memory 433f are stored pattern data used to assume the position of the game player's head based on the positions of both feet, exertion of the weight, the position of the waist, etc. from a human-factors engineering or empirical standpoint. A position determining device 433g determines the position of the game player's head based on the contents stored in the foot position information memory 433b, the weight leaning information memory 433c, the center of gravity position information memory 433e and the statistical learning pattern memory 433f. The determined head position information is sent to the game control unit 100.

By laying the pressure-sensitive sheet member 431 on the play area in this way, the transverse position of the head above the pressure-sensitive sheet member 431 can be determined based on the position information on the game player's feet. Therefore, it is not necessary to specially prepare an arrangement space and a construction for the head detector.

(5) FIG. 16 is a diagram showing another embodiment of the pressure-sensitive sheet member of the head detector. A head detector 530 is provided with a pressure-sensitive sheet member 531 laid on the play area and is adapted to detect the positions of both feet of the game player and determine the position of his head using this information and other pieces of information to be described later.

Figure 16C:
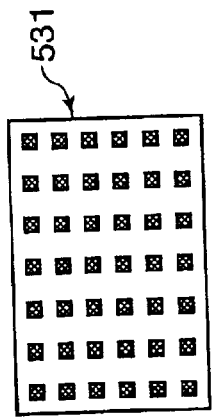
FIGS. 16A, 16B and 16C are diagrams showing other embodiments of a pressure-sensitive sheet members of the head detector.
Figure 16B:
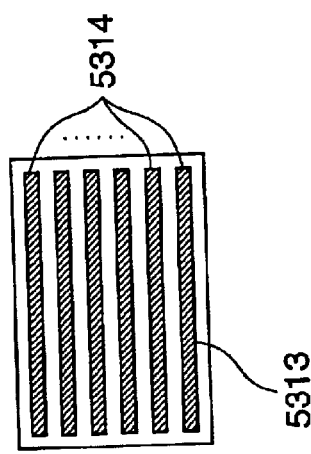
Figure 16A:
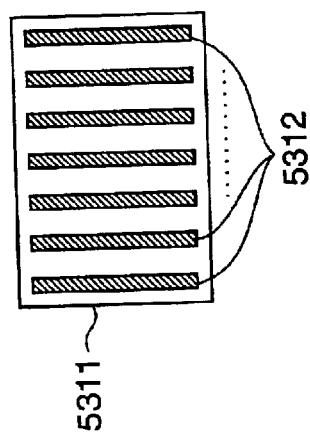

A sheet member basically fabricated by the principle of (4) using the material of (4) is adopted as the pressure-sensitive sheet member 531. Specifically, elongated pressure-sensitive conductive ink portions 5312 are arrayed at specified intervals in longitudinal direction on the rear surface of one film base 5311 as shown in FIG. 16A, whereas elongated pressure-sensitive conductive ink portions 5314 are arrayed at specified intervals in lateral direction on the rear surface of the other film base 5313 as shown in FIG. 16B. A film member 531 having pressure-sensitive portions in a matrix arrangement as shown in FIG. 16C can be fabricated as shown by adhering the rear surfaces of the both film bases 5311, 5313 together. For example, a specified voltage is successively applied at a high speed to lead wires of the respective pressure-sensitive conductive ink portions 5312 of the one film base 5311 and a voltage detecting circuit is connected with lead wires of the respective pressure-sensitive conductive ink portions 5314 of the other film base 5313. The positions of the feet on the pressure-sensitive sheet member 531 can be specified based on an application timing of the voltage to the pressure-sensitive conductive ink portions 5312 and the pressure-sensitive conductive ink portions 5314 detected to have been pressed by the voltage detecting circuit and their level can be detected. If such a pressure-sensitive sheet member 531 is used, the positions of both feet of the game player can be detected in a two-dimensional manner in transverse direction and forward and backward directions. In this embodiment, the three-dimensional position of the head of the game player standing on the pressure-sensitive sheet member 531 if the position detector 433 shown in FIG. 15 is adopted and the position determining device 433g is provided with a function of determining a position in the two-dimensional space.

Since the three-dimensional position of the game player's head can be determined in this way, the viewing point in the game space can also be moved in depth direction on the screen of the monitor 11.

(6) If the pressure-sensitive sheet member of (4) shown in FIG. 15 in which the pressure-sensitive conductive ink portions are arranged side by side in forward and backward directions is provided in addition to the head detector 130 of the second embodiment or the head detector of (1) to (3), the three-dimensional position of the game player's head can be specified as a whole since the position of the game player's head in depth direction can be specified by this pressure-sensitive sheet member.

(7) In the first embodiment, the ultrasonic receivers 32, 33 are arranged in positions located on a straight line at the left and right sides of the ultrasonic transmitter 31 to detect the height position and the transverse position of the game player's head. Instead, three ultrasonic receivers may be arranged in three positions on a horizontal plane where an ultrasonic transmitter is located, three ellipses may be determined based on periods measured by the respective ultrasonic receivers, i.e. distance information, and an intersection of these three ellipses may be detected as the position of the game player's head. This arrangement has an advantage of detecting the position of the head in the 3D space. It is sufficient to provide at least three ultrasonic receivers.

(8) Although the present invention is applied to the shooting game in the foregoing embodiment, it may be applied to a boxing game or other types of fighting games in which a game player fights with other character(s). The present invention is also applicable to, for example, a guessing game in which hidden objects are guessed by being viewed in various directions or like games in which an operation unit such as a gun unit is not particularly used.

As described above, according to the present invention, the image from the viewing point intended by the game player can be actively displayed by moving the viewing point of the simulated camera to follow free movements of the game player, thereby widening the width of a gaming character and making the game more interesting.

Further, since the operation unit can be operated in connection with the movement of the viewing point, the progress of the game becomes more interesting.

Furthermore, the position of the head in at least one direction on the horizontal plane can be determined based on the output of the sheet-shaped pressure sensor for detecting the position of both feet of the game player.

Further, the position of the head on the horizontal plane and its height position can be detected.

Furthermore, the center of gravity position of both feet can be detected and the position of the game player's head can be determined using at least this center of gravity position information.

Further, the position of the head can be detected without interfering the game player's movements.

Furthermore, the position of the game player's head can be detected using one propagation medium transmitter and two propagation medium receivers.

Further, the position of the game player's head in the 3D space can be detected using one propagation medium transmitter and three or more propagation medium receivers.

Furthermore, the position of the game player's head in one linear direction and its height, i.e. the position of his head on a vertical plane can be determined.

Further, the position of the game player's head can be determined based on the picked image of the game player.

Furthermore, the silhouette can be easily extracted from the picked image of the game player.

Further, the position of the game player's head can be determined based on the image obtained by receiving the infrared rays emitted from the infrared emitting member put on the game player.

Furthermore, the position of the head can be easily detected since a difference in brightness between the area of the game player's silhouette and the other area can be emphasized.

This application is based on Japanese Patent Application Serial No. 2000-245251 filed in Japanese Patent Office on Aug. 11, 2000, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A 3D video game machine, comprising:
   a monitor provided at a specified height position of a casing of the game machine for displaying images;
   a game control unit for controlling progress of a game;
   a display control unit for generating a 3D image viewed from a viewing point of a simulated camera and for displaying said 3D image on a screen of the monitor;
   head detecting means for detecting at least a position of the head of a game player located in a play area before the screen of the monitor in at least one linear direction in a 3D space relative to the screen of the monitor; and
   viewing point changing means for moving the viewing point of the simulated camera to follow a displacing direction and a displacing amount of the detected position of the head.

2. A 3D video game machine according to claim 1, further comprising an externally operable operation unit, wherein the game control unit causes operation contents from the operation unit to be reflected on the progress of the game.

3. A 3D video game machine according to claim 1, wherein the head detecting means includes a sheet-shaped pressure sensor for detecting positions of both feet of the game player in at least one direction on a horizontal plane, and a head position determining means for determining a position of the head in at least one direction on the horizontal plane based on detected position information of the feet.

4. A 3D video game machine according to claim 3, wherein the head detecting means further includes a distance measuring sensor for remotely detecting a height position of the head.

5. A 3D video game machine according to claim 3, wherein the pressure sensor is an analog sensor, and the head position determining means calculates a center of gravity position of the detected feet based on detection levels thereof and determining the position of the head in at least one direction on the horizontal plane using obtained center of gravity position information and feet position information.

6. A 3D video game machine according to claim 1, wherein the head detecting means further includes a distance measuring sensor for remotely detecting at least one of a height position and a transverse position of the head.

7. A 3D video game machine according to claim 6, wherein the distance measuring sensor includes one propagation medium transmitter, a first propagation medium receiver and a second propagation medium receiver arranged in two positions along the transverse direction of the screen of the monitor at the opposite sides of the propagation medium transmitter and adapted to receive propagation mediums transmitted from the propagation medium transmitter and reflected by the game player's head, and the head detecting means includes a head position determining means for determining the position of the head of the game player based on lapses of time from a point of time of transmission to reception by the first and second propagation medium receivers.

8. A 3D video game machine according to claim 1, wherein the head detecting means includes a position detecting sensor for detecting a three-dimensional position of the head and the position detecting sensor includes one propagation medium transmitter, at least three propagation medium receivers located around the propagation medium transmitter and in different positions on a horizontal plane and adapted to receive propagation mediums transmitted from the propagation medium transmitter and reflected by the game player's head and a head position determining means for determining a position of the game player's head in the 3D space based on lapses of time from a point of time of transmission to reception by the first and second propagation medium receivers.

9. A 3D video game machine according to claim 6, wherein the distance measuring means includes a plurality of propagation medium transmitting and receiving devices arranged in a linear direction on a horizontal plane located above the play area and faced downward, and the head detecting means includes a head position determining means for determining a position and a height of the game player's head in the linear direction based on elapses of time from transmission to reception of propagation mediums by the respective propagation medium transmitting and receiving devices.

10. A 3D video game machine according to claim 1, wherein the head detecting means includes an optical image pickup means and a head image extracting means for extracting an image of the game player's head from a picked image.

11. A 3D video game machine according to claim 10, further comprising a member having a background deleting surface provided at a side of the play area opposite from the image pickup means.

12. A 3D video game machine according to claim 1, wherein the head detecting means includes an infrared camera, an infrared emitting member fittable on the game player's head, and a head image extracting means for extracting an image of the game player's head from an image obtained by receiving infrared rays from the infrared emitting member.

13. A 3D video game machine according to claim 12, further comprising a member having an infrared ray absorbing surface which is provided at a side of the play area opposite from the infrared camera.

14. A 3D video game machine according to claim 12, further comprising a member having an infrared ray reflecting surface which is provided at a side of the play area opposite from the infrared camera.

15. A method for controlling a movement of a viewing point of a simulated camera in a 3D video game executed in a 3D video game machine comprising a monitor provided at a specified height position of a casing of the game machine for displaying images and a game control unit for controlling the progress of a game, the method comprising the steps of:

generating a 3D image viewed from a viewing point of a simulated camera and displaying said 3D image on a screen of the monitor;

obtaining a position information of a game player's head by causing head detecting means to repeatedly detect a position of the head of the game player standing in a play area before the screen of the monitor in at least one linear direction in a 3D space relative to the screen of the monitor; and moving the viewing point of the simulated camera to follow a displacing direction and a displacing amount of the detected position of the bead.

16. A 3D video game machine, comprising:

a monitor provided at a specified height position of a casing of the game machine for displaying images;

a game control unit for controlling progress of a game;

a display control unit for generating a 3D image viewed from a viewing point of a simulated camera and for displaying said 3D image on a screen of the monitor;

head detecting means for detecting at least a position of the head of a game player located in a play area before the screen of the monitor in at least one linear direction in a 3D space relative to the screen of the monitor, the head detecting means including a sheet-shaped pressure sensor for detecting positions of both feet of the game player in at least one direction on a horizontal plane;

head position determining means for determining a position of the head in said at least one direction on the horizontal plane based on detected position information of the feet; and viewing point changing means for moving the viewing point of the simulated camera to follow a displacing direction and a displacing amount of the detected position of the head by said head position determining means.

* * * * *